March 15, 1927.  
W. H. KRAUSER  
1,621,372  
AUTOMOBILE SIGNAL CONTROL SWITCH  
Filed Sept. 7, 1922
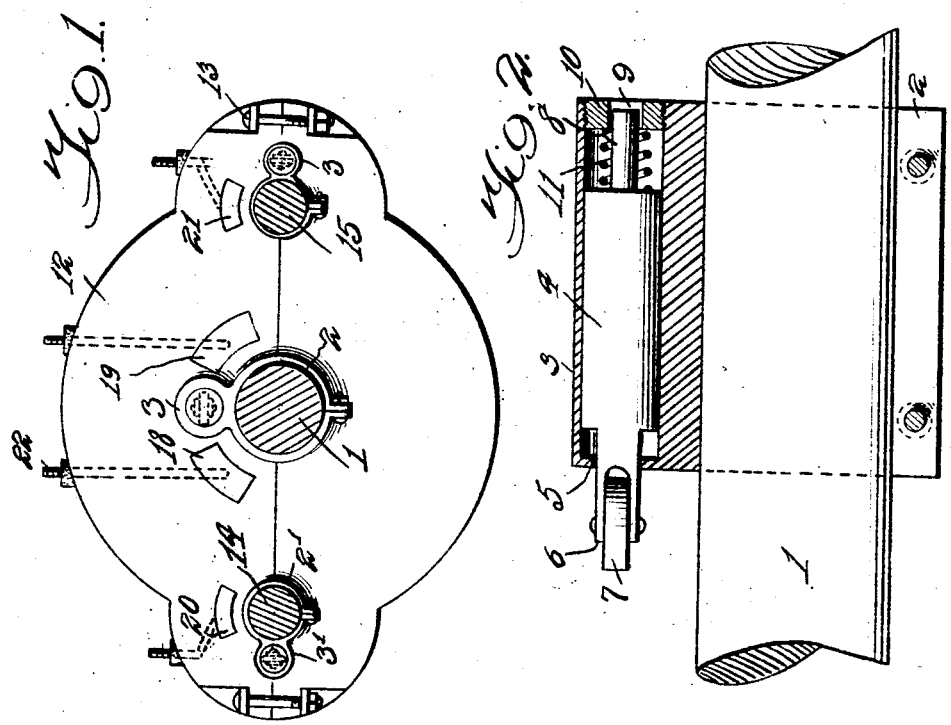
Inventor  
William H. Krauser  
Witnesses  
Richard B. Owen  
Attorney

Patented Mar. 15, 1927.

1,621,372

UNITED STATES PATENT OFFICE.

WILLIAM H. KRAUSER, OF MILTON, PENNSYLVANIA.

AUTOMOBILE SIGNAL CONTROL SWITCH.

Application filed September 7, 1922. Serial No. 586,686.

The present invention relates to a signal for automobile vehicles and the like and has for its principal object to provide a direction indicating mechanism controllable by the steering column as it is operated to turn the vehicle in various directions.

Another important object of the invention is to provide a switch controlling means for the parking light operable by the spark throttle and a stopping signal operable by the gas throttle on a Ford automobile.

Another object of the invention is to provide a simple and efficient circuit closure which is especially reliable in operation with a signal such as is hereinafter described.

With the above and numerous other objects in view as will appear as the description progresses, the invention resides in certain novel features of construction and the combination and arrangement of parts as will be hereinafter more fully described and claimed.

In the drawings:—

Figure 1 is a section through a steering column, a spark controlled rod, a gas controlled rod, showing attached thereto a circuit breaking and closing mechanism, and Figure 2 is a detail of a portion of the circuit closing mechanism.

Referring to the drawing in detail it will be seen that 1 designates a steering column upon which is disclosed a clamped device 2 carrying a cylinder 3 in which is slidably mounted a shank 4 that extends through an opening 5 in the end of the cylinder 3, the shank being reduced and bifurcated as at 6 so that a roller 7 may be journalled therein. The other end of the shank is reduced as at 8 and extends through an opening 9 in a plug 10 mounted in the other end of the cylinder and a coil spring 11 is disposed about the reduced end 8 bearing against the end of the shank 4 and the inner side of the plug 10 so as to normally hold the reduced end 6 extended through the opening 5.

A plate 12 is formed in two sections which are clamped together by bolts 13 so as to engage about the steering mechanism and the spark throttle rod 14 and also the throttle rod 15. These rods 14 and 15 have mounted thereon the clamps 2' and the cylinders 3' which are constructed identical with the mechanism described in detail in conjunction with the clamp 2 and cylinder 3 but preferably are made on a small scale. A pair of plates 18 and 19 are disposed in spaced relation to each other adjacent the steering column 1 so as to be engaged by the roller 7. A plate 20 is disposed adjacent the spark rod 14 and a similar plate 21 is situated adjacent the gas rod 15 so as to be engaged by the respective rollers. The terminal rods 22 connect with the plates 18, 19, 20 and 21 and suitable wires may be attached thereto.

When the plate 19 is engaged by the roller 7 of the circuit closing mechanism on the steering column 1 it will be seen that the current from the battery passes through the right signal lamp, plate 19, through the circuit closing device and steering column which is grounded. When the plate 18 is engaged the current will pass through the left signal lamp, plate 18, steering column 1 to the ground. When the plate is engaged by the circuit closing device on the gas operating rod 15, the current passes through the stop light, plate 21 and through the rod 15 which is grounded. When the plate 20 is engaged the current passes from the battery through the parking light, the plate 20 and the spark controlled rod 14 which is grounded.

Although I have described my invention with some degree of particularity, it is to be understood that only the preferred embodiment has been shown and that numerous changes in the details of construction and in the combination and arrangement of parts may be resorted to without departing from the spirit of the invention as hereinafter claimed.

Having thus described my invention what I claim as new is:—

1. A switching apparatus comprising a switch plate of substantially circular formation having lateral semi-circular projections, means for detachably mounting the said switch plates upon the steering column and control rods of a vehicle, contact plates secured upon the upper face of the switch plates adjacent the steering column and control rods, and contact members adapted to be secured upon the operating apparatus including a sleeve adapted to be disposed in parallel position with the operating members, detachable clamps secured to the sleeves arranged for detachable connection of the sleeve upon the operating members, a cylindrical shank mounted for axial movement in each of the sleeves, spring means arranged in the sleeves adapted to normally urge the shanks in outwardly projecting positions in contact with the switch plate and rollers pivotally mounted at the outer projecting ends of the shanks normally contacting with the switch plate and adapted to engage the contact plates in predetermined position of the operating members.

2. A signal switch comprising a two-part switch plate formed for detachable connection upon the steering rod and control rods of a vehicle, arcuate contact plates secured upon the upper face of one of the switch plates adjacent the steering rod and control rods, resilient contact members engageable with the contact plates including sleeves fixed upon the steering rod and control rod in parallel position thereto, a cylindrical shank slidably mounted in each of the sleeves, compression springs mounted in the sleeves adapted to normally project the shank downwardly in contact with the switch plate, and rollers rotatably mounted in the lower contacting ends of the shanks engageable with the contact plates.

In testimony whereof I affix my signature.

WILLIAM H. KRAUSER.